United States Patent [19]

Havens et al.

[11] Patent Number: 5,296,769
[45] Date of Patent: Mar. 22, 1994

[54] AIR GUIDE ASSEMBLY FOR AN ELECTRIC MOTOR AND METHODS OF MAKING

[75] Inventors: Paul W. Havens, Abingdon, Va.; Dennis J. Mancl, Bluff City, Tenn.

[73] Assignee: Electrolux Corporation, Marietta, Ga.

[21] Appl. No.: 825,613

[22] Filed: Jan. 24, 1992

[51] Int. Cl.⁵ .......................... H02K 5/16; H02K 5/15; H02K 9/06; F04B 39/12
[52] U.S. Cl. ......................................... 310/90; 310/89; 310/58; 310/62; 417/423.2; 415/211.2; 415/208.1
[58] Field of Search .................... 310/58, 59, 89, 90, 310/62, 63, 67 R, 51; 417/366, 368, 369, 423.2, 423.14; 415/208.1, 211.2, 213.1

[56] References Cited

U.S. PATENT DOCUMENTS

| | | | |
|---|---|---|---|
| 993,985 | 5/1911 | Harker | 417/369 |
| 1,868,659 | 12/1927 | Enberg et al. | 417/234 |
| 2,037,557 | 4/1936 | Ahnstrom | 417/423.2 |
| 2,096,891 | 10/1937 | Fredlund | 417/423.2 |
| 2,202,999 | 6/1940 | Smellie | 15/13 |
| 2,236,265 | 3/1941 | Hansson et al. | 230/117 |
| 2,244,165 | 6/1941 | MacFarland et al. | 183/63 |
| 2,245,179 | 6/1941 | Boivie | 230/127 |
| 2,296,351 | 9/1942 | Kasper | 230/132 |
| 2,360,211 | 10/1944 | Doughman | 417/423.2 |
| 2,422,860 | 6/1947 | Seyfried | 230/55 |
| 2,486,619 | 11/1949 | Troxler | 230/117 |

(List continued on next page.)

FOREIGN PATENT DOCUMENTS

| | | | |
|---|---|---|---|
| 0391338 | 10/1985 | European Pat. Off. | |
| 223584A1 | 6/1985 | Fed. Rep. of Germany | |
| 57-30475 | 7/1982 | Japan | F04D 29/44 |
| 0108499 | 7/1982 | Japan | 415/211.2 |
| 0212399 | 12/1982 | Japan | 415/211.2 |
| 0113297 | 6/1984 | Japan | 415/211.2 |
| 0122799 | 7/1984 | Japan | 415/211.2 |
| 0122800 | 7/1984 | Japan | 415/211.2 |
| 60-153498 | 4/1985 | Japan | F04D 29/44 |
| 63-109300 | 5/1988 | Japan | F04D 29/44 |
| 1-280700 | 6/1989 | Japan | F04D 29/44 |
| 2-245498 | 10/1990 | Japan | F04D 29/44 |
| 0105099 | 5/1991 | Japan | 415/211.2 |

OTHER PUBLICATIONS

Patent Abstracts of Japan, unexamined applns, M field, vol. 9, No. 319, Dec. 14, 1985, Pat. Off. Jap. Gov't., p. 95, M 439, No. 60-153 498 (Sanyo Denki K.K.).
Patent Abstracts of Japan, unexamined applns, E field, vol. 13, No. 534, Nov. 29, 1985, Pat. Off. Jap. Gov't., p. 92, E 852, No. 1-218 337 (Matsushita Electric).

*Primary Examiner*—Steven L. Stephan
*Assistant Examiner*—C. LaBalle
*Attorney, Agent, or Firm*—Nicola A. Pisano

[57] ABSTRACT

An air guide and motor housing assembly for use in domestic and commercial vacuum cleaners is described wherein the assembly comprises an air guide having a center detail for engaging the motor housing to facilitate assembly of the components, and reduce creep, turbulence and vibration-induced noise. An air guide for use with a centrifugal fan is described wherein the air guide is mounted on a motor bracket using the same rivets that fasten a bearing assembly to the motor bracket. Alternative embodiments of the device are also described in which a step in an inner fan housing cooperates with a step projecting from the air guide to securely fasten the air guide to the motor assembly, and a center detail on the air guide engages the motor housing to secure the air guide thereto, thereby providing the same advantages. Methods are provided for assembling an air guide and a motor housing together using fewer parts and assembly steps than conventional arrangements, and which permit reduction in the overall noise level of the finished appliance.

31 Claims, 7 Drawing Sheets

U.S. PATENT DOCUMENTS

| | | | |
|---|---|---|---|
| 2,612,843 | 10/1952 | Gruetjen | 103/87 |
| 2,658,665 | 11/1953 | Tschudy | 230/117 |
| 2,915,237 | 12/1959 | Galiulo et al. | 230/117 |
| 3,000,038 | 9/1961 | Heavner | 15/412 |
| 3,171,353 | 3/1965 | McMahan | 103/87 |
| 3,243,102 | 3/1966 | McMahan | 230/117 |
| 3,246,359 | 4/1966 | Griffiths | 15/323 |
| 3,628,882 | 12/1971 | Nilsson | 415/119 |
| 3,791,772 | 2/1974 | Keimpena et al. | 417/423 A |
| 3,791,774 | 2/1974 | Vonk | 417/423.2 |
| 3,932,911 | 1/1976 | Crooks et al. | 15/327 D |
| 4,057,370 | 11/1977 | Numata et al. | 417/366 |
| 4,065,233 | 12/1977 | Toriope et al. | 417/368 |
| 4,082,478 | 4/1978 | Schmitz | 415/209 |
| 4,111,615 | 9/1978 | Wanatabe | 417/423 A |
| 4,150,913 | 4/1979 | Davis | 415/119 |
| 4,483,412 | 11/1984 | Couturier | 181/204 |
| 4,669,952 | 6/1987 | Forsyth, III et al. | 415/119 |
| 4,679,990 | 7/1987 | Yamaura et al. | 417/312 |
| 4,735,555 | 4/1988 | Erickson, Jr. | 417/423.2 |
| 4,767,285 | 8/1988 | Jyoroku et al. | 417/366 |
| 4,773,829 | 9/1988 | Veltori | 417/366 |
| 4,808,090 | 2/1989 | Evans | 417/423.2 |
| 4,824,333 | 4/1989 | Erickson, Jr. | 417/360 |
| 4,992,690 | 2/1991 | Baker | 310/89 |

AIR GUIDE ASSEMBLY FOR AN ELECTRIC MOTOR AND METHODS OF MAKING

BACKGROUND OF THE INVENTION

The present invention relates generally to the field of air guides used in conjunction with centrifugal fans to provide air power for electric motors. More particularly, the present invention relates to air guide and motor housing structures used with electric motors in appliances, such as vacuum cleaners, and methods of making such structures.

Electric motors are used in many domestic and commercial appliances requiring relatively high suction from a compact electric motor, such as in vacuum cleaners.

Several types of structures are known to redirect a radially outward airstream created by a centrifugal fan so that the redirected airstream flows parallel to the motor longitudinal axis. Typically such a structure, generally designated an "air guide" or "diffuser", is mounted to the motor housing, where it accepts the airflow exiting the centrifugal fan and induces a swirling motion in the airflow as it is redirected into the motor housing.

Torigoe et al. U.S. Pat. No. 4,065,233, Numata et al. U.S. Pat. No. 4,057,370 and Japanese Laid-Open Patent Publication No. 57/1982-30475 provide examples of previously known air guide arrangements, typically involving a centrifugal fan having a central suction intake and a series of spiral shaped impeller vanes that generate a radially outward airflow. This airflow exits into a generally circular chamber, where it is deflected radially off of a casing wall and into the inlet ports of an air guide. The air guide, which comprises a series of fixed spiral vanes, has inlet ports on the side adjacent to the centrifugal fan, and outlet ports on the reverse side. Air entering the air guide through the inlet ports is deflected radially inward to the outlet ports, where it is exits across the motor windings. In such devices, the air guide constitutes a separate element that is aligned with the openings in the motor housing and then affixed to the motor casing using fastening elements.

Japanese Laid-Open Patent Publication No. 1/1989-280700 describes a centrifugal fan, air guide and motor casing arrangement directed to reducing the noise inherent in previously known fan/air guide configurations. The publication notes that the noise resulting from the turbulence created in the airflow as it exits the fan, impinges off the fan casing and passes through the air guide, can be reduced by controlling the gap between the air guide inlet ports and the fan casing.

Similarly, Japanese Laid-Open Patent Publication No. 60/1985-153498 describes a fan/air guide configuration in which the inlet ports of the air guide extend radially outwardly beyond the diameter of the fan. The arrangement described in that publication is an attempt to reduce the noise generated by the airflow passing through the fan/air guide by controlling the ratio of the air guide diameter to the fan diameter, and also by increasing the air guide inlet port area, thereby reducing the quantity of air impinging on the obstructed areas.

A drawback encountered with known air guides is that the exit areas of the air guide must be aligned with the air intake areas of the motor housing. Once so aligned, the air guide is affixed to the motor housing by suitable means, such as screws or rivets. Such structure may have the disadvantage of being difficult to assemble by automated machines, since care must be taken in positioning the air guide so that the air passages of the air guide and motor housing are properly aligned. A further disadvantage of such an arrangement is that the motor housing must provide a surface for accepting the fastening means used to affix the air guide to the motor housing, which in turn reduces the area of the motor housing that can be dedicated as air inlet area. It would therefore be desirable to provide an air guide that reduces the effort needed to align the outlet areas of the air guide with the inlet areas of the motor housing, and that reduces the amount of effort required to fasten the air guide to the motor housing.

Previously known devices typically provide two or more screws or other fastening means to affix the air guide snugly to the motor housing to avoid vibration of the air guide and attendant noise during operation. This mode of attaching the air guide to the motor housing can result in high localized stresses in the air guide where it is attached by the fastening means. As a result, creep deformation of the air guide locally adjacent to the fastening means may result in loosening of the air guide relative to the motor housing, causing vibration and noise during operation. It would therefore be desirable to provide an air guide that can be affixed to the motor housing so as to be resistant to creep-induced deformation and vibration.

The above cited publications show that the noise associated with the turbulence generated in redirecting the airflow exiting the fan into the motor housing can be reduced by controlling the dimensions of the gap between the air guide and the fan casing, and the fan diameter and the air guide diameter. While these parameters permit some noise reduction in the previously known fan/air guide configurations, those designs are limited by the noise created by the constriction of the air flow where it enters the inlet ports of the motor housing. It would therefore be desirable to develop an air guide allowing further noise reduction by reducing the extent of constriction of the airflow as it exits the air guide and enters the motor housing.

SUMMARY OF THE INVENTION

In view of the foregoing, it is an object of the present invention to provide an air guide and motor housing structure which facilitate automatic assembly, so that the need to manually align the respective openings in the air guide and motor housing is reduced or eliminated.

It is a another object of this invention to provide an air guide and motor housing structure that reduces the area of the motor housing needed to accept fastening means to affix the air guide to the motor housing, thereby increasing the area of the motor housing that can be dedicated as air inlet area.

It is yet another object of this invention to provide an air guide and motor housing structure which reduces the number of steps required to assemble the air guide and motor housing, to facilitate automated manufacture of the appliance.

It is still another object of this invention to provide an air guide and motor housing structure wherein all points of contact between the air guide and motor housing are preloaded during assembly, so that vibration of the air guide against the motor housing is lessened.

It is another object of this invention to provide an air guide and motor housing configuration which reduces noise generated by constrictions in the area of the passage for air passing from the air guide outlets into the motor housing inlet areas.

Further in view of the foregoing, it would be desirable to provide methods for achieving the above-mentioned advantages.

These and other objects of the invention are accomplished in accordance with the principles of the invention by providing an air guide and motor housing arrangement wherein the motor housing end adjacent to the air guide comprises a bracket that serves to hold the motor bearing and also cooperates with center details on the air guide to retain the air guide in position on the motor housing. An air guide comprising a plurality of fixed spiral vanes extending from its inlet ports located on the side adjacent to the fan to its outlet ports on the reverse side includes integrally formed center details that cooperate with the motor housing to facilitate alignment and mounting of the air guide thereon.

In a first embodiment the air guide includes apertures for accepting rivets that fasten the air guide to the motor housing and extend through the bracket of the motor housing to retain the motor bearing in the bracket. In a first alternative embodiment, the center details align the air guide on the bracket, while a stepped portion on the periphery of the air guide cooperates with a fan housing to secure the air guide in place. In a second alternative embodiment the center detail engages a portion of the motor housing to securely fasten the air guide thereto. In these embodiments, the motor bracket is configured so that adjacent faces of the air guide and the motor bracket contact at positions near the center and along the periphery of the respective pieces, to preload the air guide and to reduce vibration.

Air guides constructed in accordance with the invention also include the feature of chamfering the air inlet ports, to reduce the area upon which the airflow impinges, and thereby further reduce the noise of the appliance.

In accordance with the principles of the invention, methods are provided for constructing appliances employing air guides wherein noise induced by vibration and air turbulence is reduced. Methods are also provided for reducing the number of steps and parts required to assemble such appliances relative to previously known devices.

BRIEF DESCRIPTION OF THE DRAWINGS

Further features of the invention, its nature and various advantages will be more apparent from the following detailed description, taken in conjunction with the accompanying drawings, in which like reference numerals refer to like parts throughout, and in which.

DETAILED DESCRIPTION OF THE INVENTION

Figure 1A:
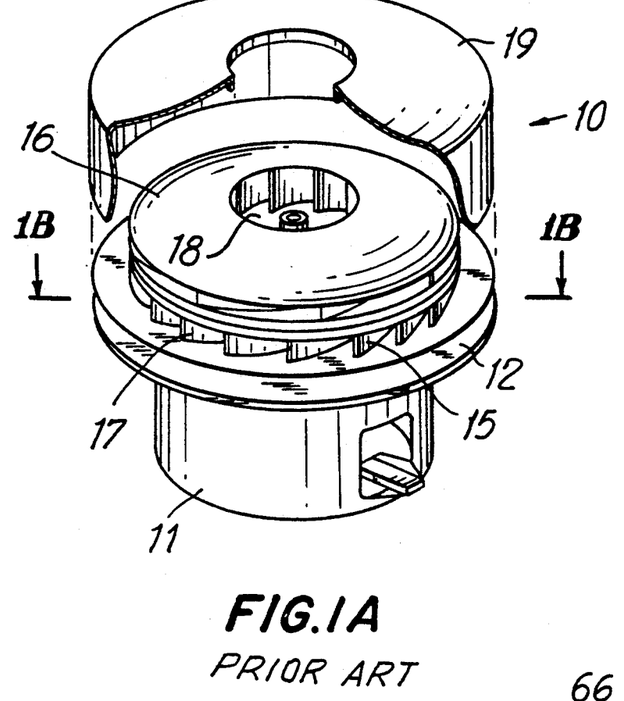
FIG. 1A is an exploded, partially fragmentary perspective view of a previously known appliance motor including a centrifugal fan and air guide.
Figure 1B:
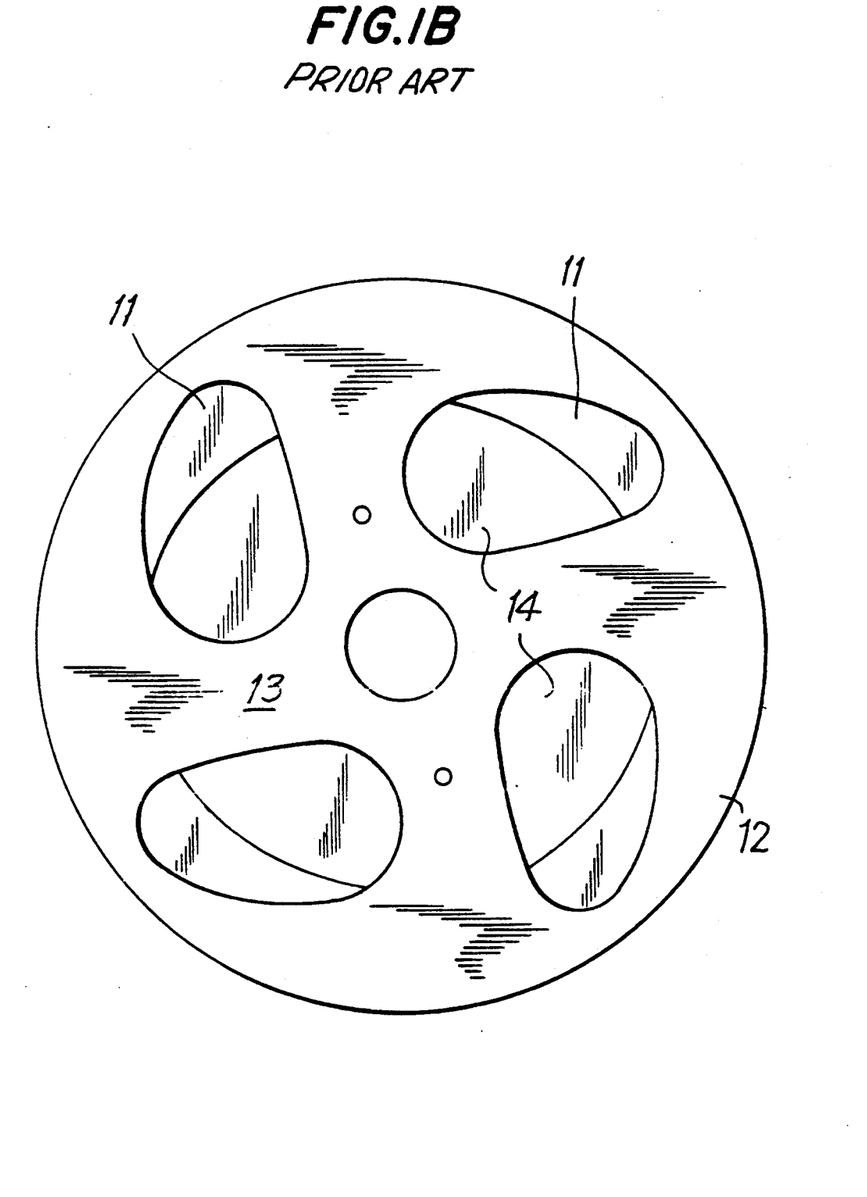
FIG. 1B is a plan view of the end plate of a previously known appliance motor, taken from line 1B—1B of FIG. 1A.

FIGS. 1A and 1B show a conventional appliance motor assembly 10 having known arrangement of centrifugal fan, air guide and motor housing. The motor assembly comprises an electric motor enclosed in motor housing 11. Motor housing 11 has flanged to its upper end plate 12 that includes a motor bracket 13 for holding the bearing assembly (not shown) in which the motor armature is rotatably mounted. Plate 12 has a plurality of holes 14 through its thickness which serve as inlet areas for the air directed through the motor windings. As shown in FIG. 1B, holes 14 in plate 12 are partially obstructed by the flange of motor housing 11. Air guide 15 is fixed to plate 12 by conventional fasteners, for example screws or rivets. Air guide 15 comprises a disk having an upper face adjacent to fan 16, and a lower face adjacent to plate 12. A plurality of stationary vanes 17 create air passages having inlet ports on the upper face and outlet ports on the lower face. The outlet ports of the air guide are aligned with holes 14 in plate 12 to permit air flowing through the air guide to be directed over the motor windings. Fan 16 is mounted on the motor shaft, and comprises a lower disk, a conical upper disk, and a plurality of vanes joining the upper and lower disks. The conical upper disk has opening 18 through which air is pushed when the fan is rotated by the motor. Fan casing 19 covers fan 16 and air guide 15 and is secured to motor housing 11 by frictionally engaging a flange on plate 12. The inner surface of fan casing 19 deflects the radially outward directed airflow exiting from fan 16 and redirects that airflow into the passages formed between vanes 17 of air guide 15.

Assembly of the appliance motor arrangement shown in FIGS. 1A and 1B typically requires separate steps of press fitting the bearing assembly into motor bracket 13, disposing air guide 15 on plate 12 of motor housing 11, aligning the outlet ports of air guide 15 with holes 14 in plate 12, fastening air guide 15 to plate 12 using rivets or screws, mounting fan 16 on the motor shaft, and then covering the fan and air guide with fan casing 19.

Figure 2:
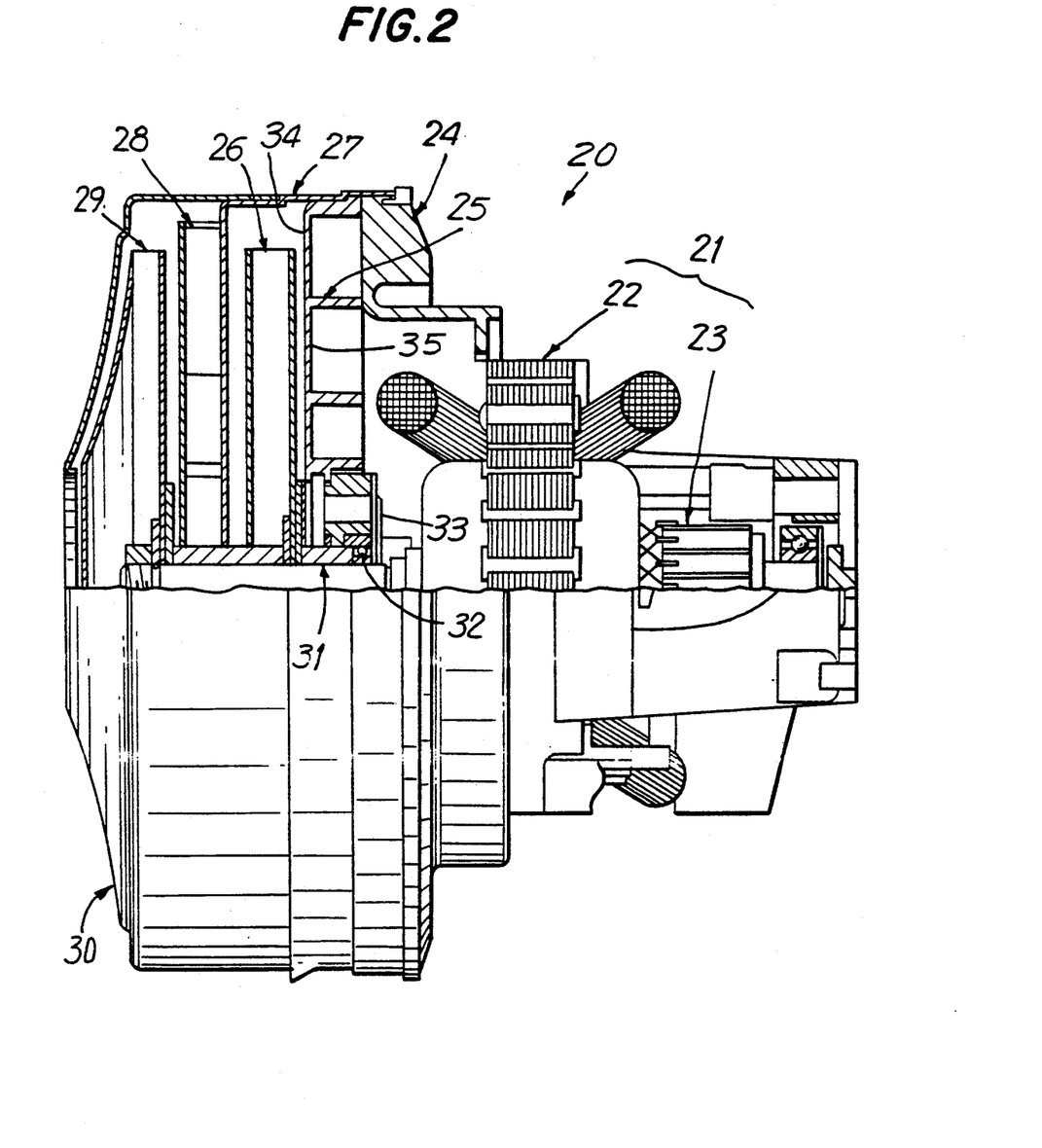
FIG. 2 is an elevational view, partially in section, of a motor including the air guide, motor bracket and inner fan housing constructed in accordance with the present invention.

Referring now to FIG. 2, an appliance motor 20 incorporating one embodiment of the present invention is described. The motor of FIG. 2 is suitable for use in a household vacuum cleaner requiring a two-stage fan, and includes conventional electric motor 21 comprising field winding 22 and armature 23. Field winding 22 and armature 23 are retained in working relation near the fan end by motor bracket 24. Interposed between motor bracket 24 and fan casing 30 are the following elements (from motor bracket 24 outward): air guide 25, inner fan 26, inner fan housing 27, outer conventional air guide 28, and outer fan 29. Inner fan 26 and outer fan 29 are mounted on shaft 31 extending from armature 23. Shaft 31 rides in bearing assembly 32, which is retained in motor bracket 24 by bearing retainer 33.

Figure 3A:
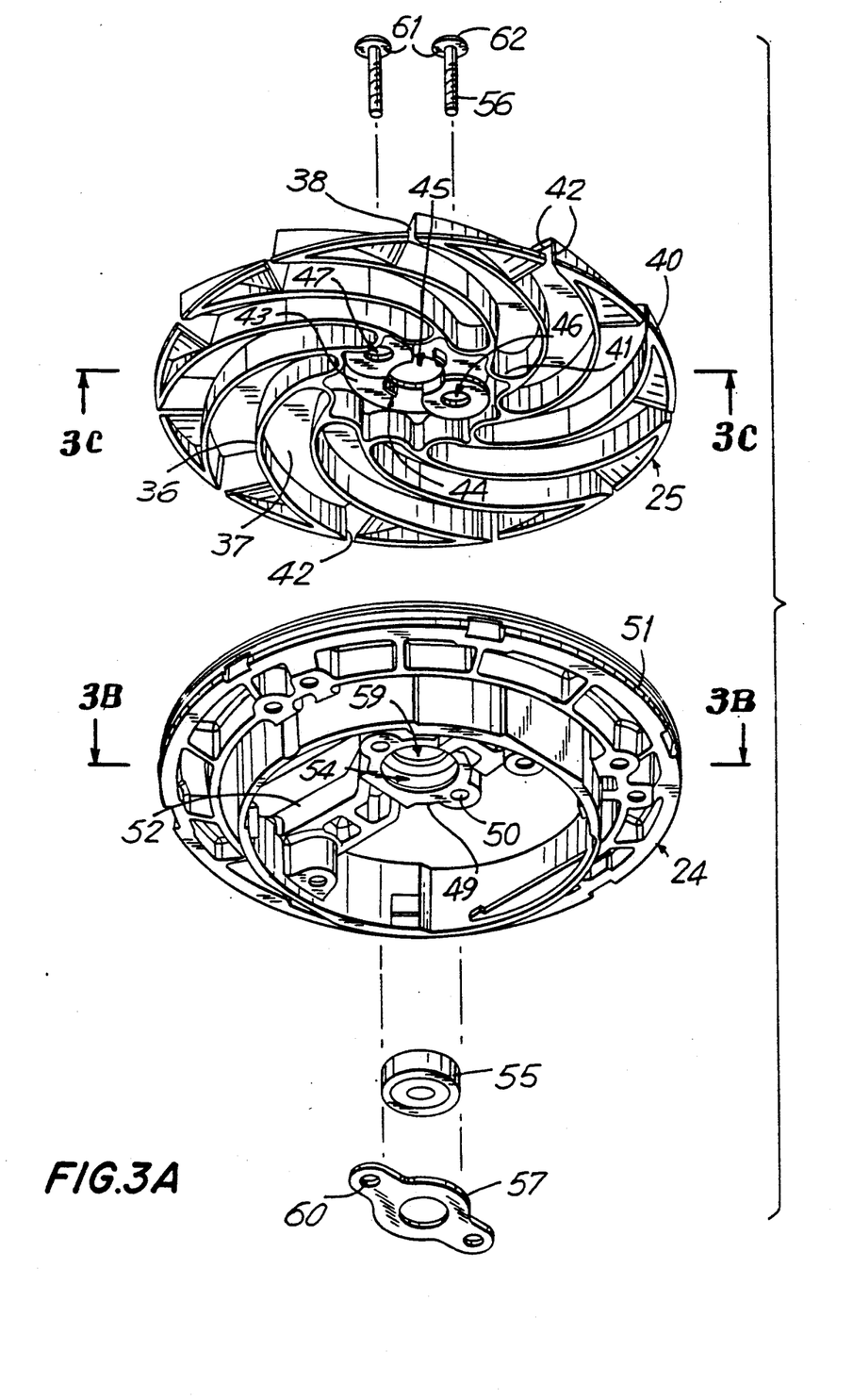
FIG. 3A is an exploded perspective view from beneath of the motor bracket, air guide and bearing assembly of a first embodiment of the present invention.
Figure 3B:
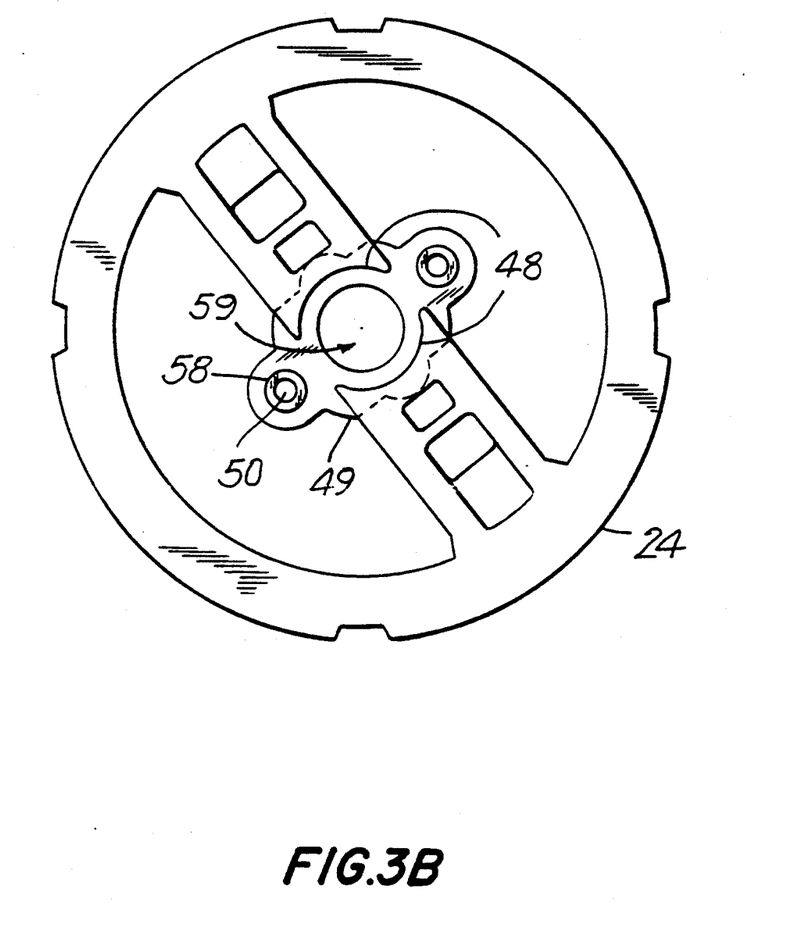
FIG. 3B is a plan view of the motor bracket of FIG. 3A, taken from line 3B—3B of FIG. 3A.
Figure 3C:
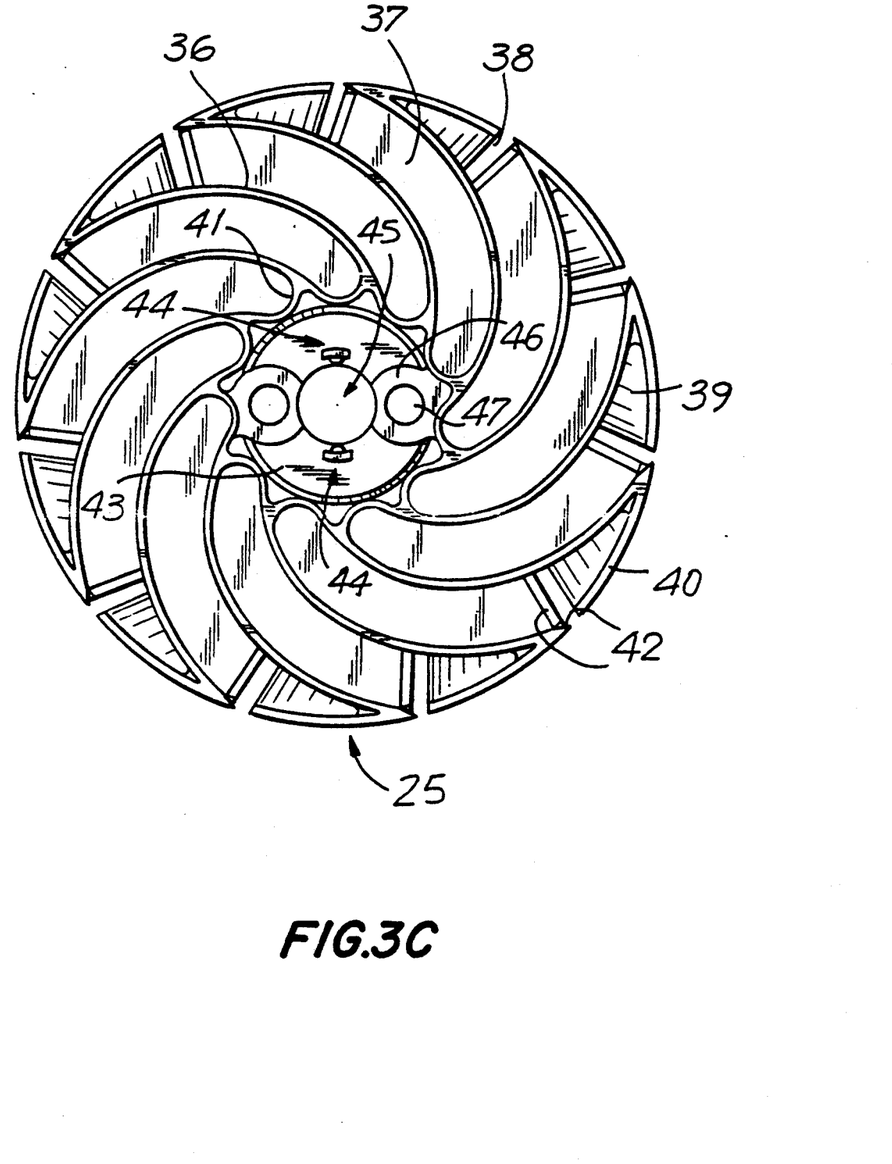
FIG. 3C is a plan view of the air guide of FIG. 3A, taken from line 3C—3C of FIG. 3A.

Referring now to FIGS. 3A, 3B and 3C, the motor bracket and air guide assembly of a first embodiment of the present invention shown in FIG. 2 are described. Unlike previously known devices, where the motor armature is supported by a bearing assembly carried by plate 12 of the motor housing 11, and air guide 15 is separately aligned with and fastened to the plate, the present invention includes air guide 25 and motor bracket 24 that facilitate assembly of the appliance and provide the advantageous features described above.

Air guide 25 comprises a disk having first surface 34 disposed adjacent and beneath fan 26 and second surface 35 adjacent to motor bracket 24. A plurality of radially outwardly curved vanes 36 project from second surface 35 of air guide 25 to form a mating surface with the motor housing. Passages 37 formed between respective adjacent vanes 36 projecting from second surface 35 have inlet ports or openings 38 that communicate with first surface 34 and have outlet ports forming open channels on second surface 35. These passages or channels on second surface 35 communicate freely with motor bracket 24 at the interface between air guide 25 and motor bracket 24. Each opening 38 has a triangular-shaped ramp 39 associated with it, that is integrally formed with the radially peripheral end of the respective adjoining vane 36. The outer peripheral edge of the air guide may include a stepped rim 40. Each ramp 39 has an upper surface that is inclined from an apex, where it meets first surface 34 of air guide 25, to the base, adjacent to the respective opening 38. Respective adjacent vanes terminate near the center of air guide 25 in rounded corners 41. Each opening 38 has chamfers 42 on its leading edges, i.e., where the passages communicate with the first surface, to increase the air guide inlet area and reduce turbulence-induced noise.

In the embodiment of FIGS. 3A-C, air guide 25 has center detail 43 comprising two alignment tabs 44, a centrally located aperture 45 for allowing motor shaft 31 to pass therethrough, and two apertured rivet-supporting faces 46. Apertured rivet supporting faces 46 have apertures 47 that permit rivets to pass therethrough. Alignment tabs 43 facilitate assembly of air guide 25 to motor bracket 24 by centering the air guide within recess 48 in raised portion 49 of motor bracket 24. Since the vanes of air guide 25 are circumferentially symmetric, the air guide may be positioned with either of two orientations 180 degrees apart, so long as apertures 47 align with apertures 50 provided in motor bracket 24, as described hereinafter.

Figure 5A:
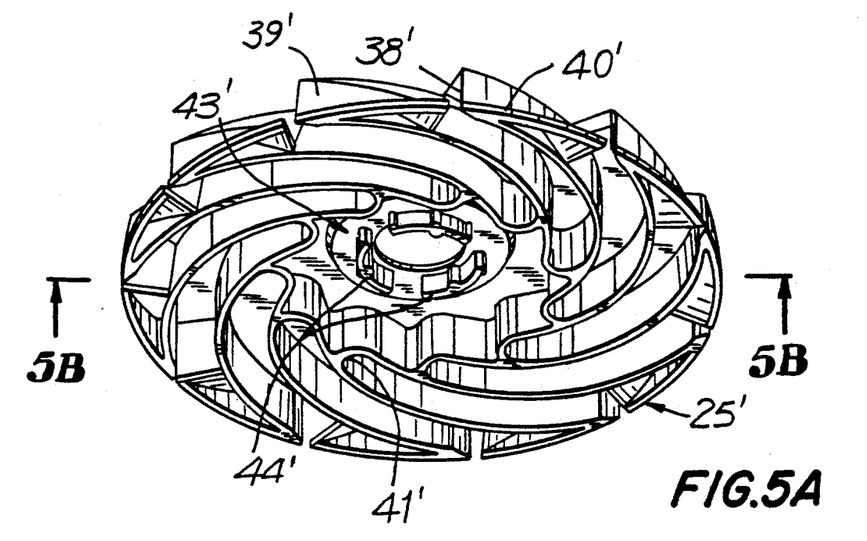
FIG. 5A is a perspective view from beneath of an alternate embodiment of the air guide of the present invention.
Figure 5B:
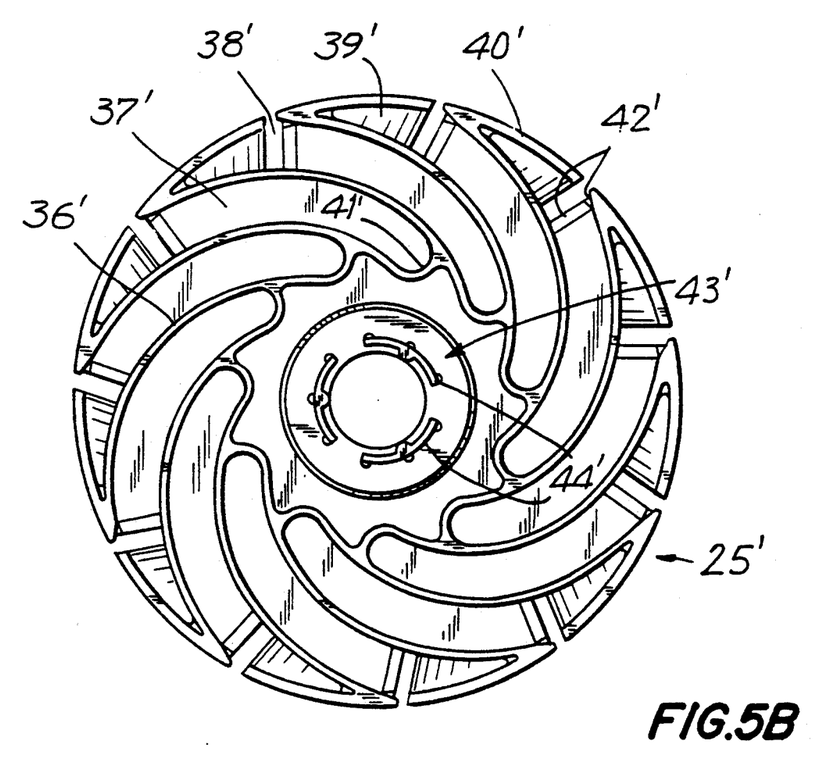
FIG. 5B is a plan view of the air guide of FIG. 5A, taken from line 5B—5B of FIG. 5A.

By comparison, air guide 25' of the alternate embodiment of FIGS. 5A and 5B is identical to that of FIGS. 3A and 3C, except that air guide 25' has no apertured rivet-supporting faces 46. Instead, air guide 25' has larger locating tabs 44' which engage recess 48 of motor bracket 24. Consequently, the air guide of FIGS. 5A-B can be assembled to motor bracket 24 without regard to the orientation of the air guide, i.e., the air guide does not need to have the outlet ports of passages 37' on the second surface aligned with circumferentially positioned features of the motor bracket.

Referring again to FIGS. 3A-B, motor bracket 24 comprises ring 51 and integral bracket 52 formed of a creep-resistant material. Bracket 52 spans the diameter of ring 51 and has an open-web construction that minimizes obstruction of the air inlet area of the motor. Raised portion 49 located on bracket 52 provides a stepped indentation 54 to retain bearing assembly 55, and apertures 50 through which the lower ends of rivets 56 pass to engage bearing retainer 57.

The surface of bracket 52 adjacent to air guide 25 includes raised motor housing post surfaces 58 that surround apertures 50. Raised motor housing post surfaces 58 project through apertures 47. Bracket 52 also has centrally located aperture 59 for enabling the shaft of motor 22 to pass therethrough. As shown in FIG. 3A, rivets 52 pass through apertures 47 of rivet-supporting faces 46, apertures 50 of motor bracket 24, and holes 60 in bearing retainer 57. The rivets are peened against bearing retainer 57 to hold the entire assembly together securely.

When assembled in this manner, rivet head surfaces 61 are secured firmly against both apertured rivet-supporting faces 46 and raised motor housing post surfaces 58 of motor housing 24. The diameter of rivet head 62 is larger than the diameter of raised motor housing post surface 58, and, of course, larger than the diameter of aperture 47 in air guide 25. Apertured rivet-supporting faces 46 of air guide 25 and raised motor housing post surfaces 58 are dimensioned so that prior to installation of rivets 56, an axial gap exists between apertured rivet supporting faces 46 and raised motor housing post surfaces 58. Consequently, when rivets 56 are then installed, apertured rivet-supporting faces 46 are pulled down by rivet heads 62 into contact with raised motor housing post surfaces 58.

This arrangement serves to preload the air guide, i.e., create clamping forces in the air guide. Thus, when the plastic constituting the air guide experiences creep, the air guide is less likely to become loose. The preload on the air guide, together with the small contact area between the air guide and motor housing——substantially only at center detail 43 and rim 40——serve to reduce vibration-induced noise throughout the lifetime of the appliance.

Assembly of air guide 25 and motor bracket 24 as described above provides a number of other advantages over previously known devices. The present invention permits a significant reduction in the number of steps necessary to assemble a fan/air guide assembly, both in the number of parts used and effort required to assemble them. In particular, in contrast to the method of assembly described above for the previously known device of FIGS. 1A and 1B, the arrangement of FIG. 3A permits a method omitting the steps of press fitting the bearing assembly into the motor bracket and separately fastening the air guide to the motor housing. Furthermore, the step of aligning the outlet ports of the air guide with the openings in the motor housing is greatly simplified by the locating function of center detail 43. The dual purpose rivets of the first embodiment of the present invention permit the air guide to be fastened to the motor housing in the same assembly step as that of installing the bearing assembly, thereby achieving economy of labor and parts.

Comparison of motor bracket 24 of the present invention (FIG. 3B) with an end plate of a typical previously known design (FIG. 1B) shows the significant increase in inlet airflow area provided by the motor bracket of the present invention. At the same time, the open-web configuration of motor bracket 24 eliminates the need to align the outlet ports of air guide 25 with the inlet areas of the motor housing, as is required for previously known devices such as that of FIG. 1B. The configuration of the motor bracket of the present invention also reduces the noise associated with the turbulence induced in the air flow where the air flow is constricted as it enters the motor housing. Instead, the open-web design of motor bracket 24 of the present invention provides little obstruction to the airflow exiting from air guide 25.

The present invention includes the method of assembling the appliance components so as to preload, i.e. apply clamping forces to, the parts during assembly to reduce vibration-induced noise over the lifetime of the appliance. This method comprises the steps of providing a center detail and a rim on the air guide, as described above, and providing a motor housing bracket so that the air guide and motor housing contact each other substantially only at these locations. The method further includes the step of fastening the air guide and motor housing together to induce a compressive load in the contacting portions, which serves to reduce loosening of the parts and the resulting vibration-induced noise. Alternatively, the center detail can be configured to engage the motor housing to secure the two parts against vibration without the addition of a rim.

The air guides of the present invention provide further reduction of turbulence-induced noise through the use of more than nine, and preferably eleven, volute passages 37, rather than seven to nine volutes, as is conventional. Applicants have determined that the use of a greater number of volute passages in the air guide reduces the surface area over which the air deflected from the fan casing must travel, and therefore permits smaller ramps 39 to be used, which in turn lowers the turbulence-induced noise. In addition, the leading edges of each inlet surface or opening 38 include chamfers 42 to further reduce the surface area constituting an obstruction to air flow through the air guide.

Figure 4:
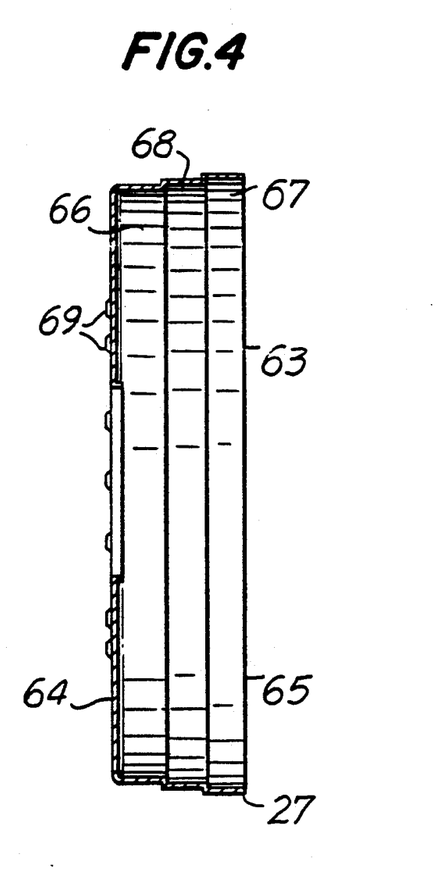
FIG. 4 is a vertical cross-sectional view of an inner fan housing for use with an air guide constructed according to the present invention.

Referring now to FIGS. 2 and 4, inner fan housing 27 constructed in accordance with the invention is described. In FIG. 2, inner fan housing 27 is shown assembled into the motor assembly, while in FIG. 4, the inner fan housing is shown in isolation, to better illustrate the inventive features. Inner fan housing 27 is disposed between outer air guide 28 and fan 26. As shown in FIG. 4, inner fan housing 27 comprises a cylindrical sleeve 63 having apertured forward end 64 and open rear end 65. Sleeve 63 has three steps, forwardmost smallest diameter step 66, rearwardmost largest diameter step 67, and intermediate step 68 of intermediate diameter. Forward end 64 of inner fan housing 27 includes a plurality of holes 69 for mounting outer air guide 28 thereto. Outer air guide 28 is of conventional construction and forms no part of the present invention.

Step 67 of inner fan housing is dimensioned to frictionally engage the circumference of motor bracket 24. Step 66 is dimensioned so that fan casing 30 frictionally engages the outer surface of step 66. Intermediate step 68 is dimensioned to capture stepped rim 40 of air guide 25. Thus, intermediate step 68 cooperates with stepped rim 40 of air guide 25 so that when step 67 engages the circumference of motor bracket 24, stepped rim 40 of the air guide is securely sandwiched between inner fan housing 27 and motor bracket 24.

Air guide 25 may be dimensioned so that in its unfastened condition, i.e., before being installed on the motor bracket, the center detail surface that mates with the motor bracket is slightly bulged or convex toward the motor bracket. In other words, the air guide surface that mates with the motor bracket resides axially below the mating motor housing surface before the air guide is installed on the motor bracket. Consequently, when the inner fan housing, air guide and motor bracket are assembled together, the bulged portion of the air guide interferes with the motor bracket to preload the air guide. This preload further prevents vibration-induced noise caused by operation of the motor, as well as loosening of the air guide from the bracket resulting from creep. As will be understood by one skilled in the art, this feature of the invention can be used in conjunction with air guide 25 of FIGS. 3A and 3C, as shown in FIG. 2, or with the alternative embodiment, air guide 25', described hereinafter.

FIGS. 5A and 5B illustrate an alternative embodiment of the air guide of the present invention, wherein features similar to those enumerated in FIGS. 3A and 3C are designated with like-primed numbers (e.g., air guide 25'). Air guide 25' is designed for use with the inner fan housing of FIG. 4. As noted heretofore, air guide 25' of FIGS. 5A-B is essentially identical to air guide 25 of FIGS. 3A and 3C, differing primarily in that rivet-supporting faces 46 are omitted, and alignment tabs 44 of the first embodiment of air guide 25 are replaced by arc-shaped tabs 44' which frictionally engage recess 48 in motor bracket 24. In this instance, with reference to FIG. 3A, bearing assembly 55 and bearing retainer 57 are directly riveted to motor bracket 24 with rivets 56. Air guide 25' is then frictionally engaged on the upper end of motor bracket 24 and may include an inward bulge that interferes with the motor housing when installed thereon. Once the fan is installed above air guide 25', inner fan housing 27 is disposed over the assembly as described heretofore so that it engages the step on stepped rim 40' of air guide 25' and holds it securely against the motor bracket.

In an alternative embodiment of air guide 25' of FIGS. 5A and B, stepped rim 40' may be omitted. In that embodiment, center detail 43 $\propto$ frictionally engages or is press fit into recess 48 of motor bracket 24 to hold the two pieces securely together. That embodiment does not require hardware such as screws or rivets to fasten the air guide to the motor bracket, because the fastening means is integral to those pieces, i.e., the manner in which the center detail engages the motor bracket.

Overall, applicants have found that the vibration and stress relaxation of air guide 25' is as satisfactory as that of the air guide 25. The alternative air guide embodiment of FIGS. 5A and 5B provides the further advantage that no effort is required to align the air guide with the motor bracket during assembly, because the air guide is entirely circumferentially symmetric.

The present invention therefore also includes the method of assembling an appliance having an air guide, a fan and a fan housing, whereby the steps of aligning the air guide with the motor housing and separately fastening the air guide thereto are eliminated completely. The assembly method includes the steps of providing a rim on the air guide, such as shown in FIGS. 3A-3C and 5A-5B, and providing a step in the fan housing to capture the rim on the air guide, such as step 59 of the fan housing of FIG. 4. After the fan is mounted on the motor shaft, the fan housing is disposed over the fan and air guide so that it engages the motor housing and holds the air guide securely against the motor housing or bracket.

Yet another method of assembling the air guide to the motor housing, without the use of separate fasteners such as screws or rivets, is available with the above-described assembly. This assembly method includes the step of providing a center detail that engages a portion of the motor housing to securely hold the two parts together, e.g., by press-fitting. The method may include the step of providing an inward bulge in the air guide where it mates with the motor housing, to introduce a preload to the respective pieces when they are assembled together.

One skilled in the art will appreciate that the present invention can be practiced by other than the described embodiments, which are presented for purposes of illustration and not of limitation, and the present invention is limited only by the claims which follow. In particular, individual elements of the illustrated embodiments could be reconfigured in accordance with the principles of this invention. Thus, for example, recess 48 of motor bracket 24 and alignment tabs 44 of air guide 25 could be reversed, so that the recess is molded into the air guide, and the alignment tabs project from the motor housing. As another example, for the embodiment wherein the inner fan housing secures the air guide to the motor housing, the preload between air guide and motor housing could be established using a flat air guide and fan housing that urges the air guide into contact with the motor bracket.

What is claimed is:

1. In an air guide and motor assembly comprising a motor having an armature and motor housing, a shaft extending from the armature, a bearing assembly mounted on the motor housing and supporting the shaft, a fan mounted on the shaft, and a vaned air guide mounted with fastening means interposed between the fan and the motor for directing the flow of air from the fan to the motor, the vaned air guide having a first surface disposed adjacent to the fan and a second surface disposed adjacent to the motor, the improvement comprising a plurality of radially outwardly curved vanes integrally formed with the vaned air guide, each one of said plurality of radially outwardly curved vanes forming a passage that communicates between the first and second surfaces, and a center detail integrally formed with the vaned air guide, the center detail comprising at least one locating tab and a fastener-supporting surface, the motor housing having a recess for accepting the locating tab, the center detail cooperating with the motor housing so that the fastening means contacts the fastener-supporting surface to fasten both the bearing assembly and the vaned air guide to the motor housing.

2. The air guide and motor assembly as defined in claim 1 wherein the center detail of the vaned air guide assists in locating the vaned air guide in position on the motor housing.

3. The air guide and motor assembly as defined in claim 1 wherein the vaned air guide further comprises a rim, the center detail and the rim cooperating with the motor housing so that the vaned air guide contacts the motor housing substantially only at the center detail and the rim, thereby reducing vibration of the vaned air guide against the motor housing.

4. The air guide and motor assembly as defined in claim 3 wherein the contact between the vaned air guide and the motor housing substantially only at the rim and center detail creates a preload in the vaned air guide, the preload reducing creep-induced loosening and vibration of the vaned air guide against the motor housing.

5. The air guide and motor assembly as defined in claim 1 wherein the motor housing has an open-web construction, the vaned air guide cooperating with the open-web construction of the motor housing so that airflow exiting the passages is substantially without constriction.

6. The air guide and motor assembly as defined in claim 5 wherein the plurality of radially outwardly curved vanes forms more than nine passages.

7. The air guide and motor assembly as defined in claim 5 wherein each passage has a chamfered edge at the inlet surface.

8. In an air guide and motor assembly comprising a motor having a motor housing, a fan rotatably driven by the motor, and a vaned air guide mounted interposed between the fan and the motor for directing the flow of air from the fan to the motor, the vaned air guide having a first surface disposed adjacent to the fan and a second surface disposed adjacent to the motor, the improvement comprising a plurality of radially outwardly curved vanes integrally formed with the vaned air guide, each one of said plurality of radially outwardly curved vanes forming a passage that communicates between the first and second surfaces, and a center detail integrally formed with the vaned air guide, the center detail comprising a plurality of arc-shaped tabs, the motor housing having a recess for accepting the plurality of arc-shaped tabs, the plurality of arc-shaped tabs frictionally engaging the vaned air guide to the motor housing to securely fasten the vaned air guide thereto, without screws or rivets.

9. The air guide and motor assembly as defined in claim 8 wherein the vaned air guide further comprises a rim, the center detail and the rim cooperating with motor housing so that the vaned air guide contacts the motor housing substantially only at the center detail and the rim, thereby reducing vibration of the vaned air guide against the motor housing.

10. The air guide and motor assembly as defined in claim 9 wherein the contact between the vaned air guide and the motor housing substantially only at the rim and center detail creates a preload in the vaned air guide, the preload reducing creep-induced loosening and vibration of the vaned air guide against the motor housing.

11. The air guide and motor assembly as defined in claim 1 wherein the motor housing has an open-web construction, the vaned air guide cooperating with the open-web construction of the motor housing so that airflow exiting the passages is substantially without constriction.

12. The air guide and motor assembly as defined in claim 11 wherein the vaned air guide comprises vanes forming more than nine passages.

13. The air guide and motor assembly as defined in claim 11 wherein each passage has a chamfered edge at the inlet surface.

14. In an air guide and motor assembly comprising a motor having a motor housing, a fan rotatably driven by the motor, a fan housing covering the fan, and a vaned air guide mounted interposed between the fan and the motor for directing the flow of air from the fan to the motor, the vaned air guide having a first surface disposed adjacent to the fan and a second surface disposed adjacent to the motor, the improvement comprising a plurality of radially outwardly curved vanes integrally formed with the vaned air guide, each one of said plurality of radially outwardly curved vanes forming a passage that communicates between the first and second surfaces, a center detail integrally formed with the vaned air guide, the center detail comprising at least one locating tab, and a rim having a step integrally formed with the vaned air guide, the motor housing having a recess for accepting the locating tab, the center detail cooperating with the motor housing to locate the vaned air guide in position on the motor housing, the step captured between the motor housing and the fan housing so that the vaned air guide is securely fastened therebetween.

15. The air guide and motor assembly as defined in claim 14 wherein the center detail and the rim cooperate with the motor housing so that the vaned air guide contacts the motor housing substantially only at the center detail and the rim, thereby reducing vibration of the vaned air guide against the motor housing.

16. The air guide and motor assembly as defined in claim 15 wherein the motor housing has an open-web construction, the vaned air guide cooperating with the open-web construction of the motor housing so that airflow exiting the passages is substantially without constriction.

17. The air guide and motor assembly as defined in claim 16 wherein the plurality of radially outwardly curved vanes form more than nine passages.

18. The air guide and motor assembly as defined in claim 16 wherein each passage has a chamfered edge at the inlet surface.

19. The air guide and motor assembly as defined in claim 15 wherein the contact between the vaned air guide and the motor housing substantially only at the rim and center detail creates a preload in the vaned air guide, the preload reducing creep-induced loosening and vibration of the vaned air guide against the motor housing.

20. In an air guide and motor assembly comprising a motor having an armature and a motor housing, a shaft extending from the armature, a fan mounted on the shaft, and a vaned air guide mounted interposed between the fan and the motor for directing the flow of air from the fan to the motor, the vaned air guide having a first surface disposed adjacent to the fan and a second surface disposed adjacent to the motor, the improvement comprising a plurality of radially outwardly curved vanes integrally formed with the vaned air guide, each one of said plurality of radially outwardly curved vanes forming a passage that communicates between the first and second surfaces, a center detail and a rim integrally formed with the vaned air guide, the center detail comprising at least one locating tab, the motor housing having a recess for accepting the locating tab, the center detail engaging the recess, so that the vaned air guide contacts the motor housing substantially only at the center detail and the rim, thereby reducing vibration of the vaned air guide against the motor housing.

21. The air guide and motor assembly as defined in claim 20 wherein the contact between the vaned air guide and the motor housing substantially only at the rim and center detail creates a preload in the vaned air guide, the preload reducing creep-induced loosening and vibration of the vaned air guide against the motor housing.

22. The air guide and motor assembly as defined in claim 20 wherein the motor includes a bearing assembly mounted on the motor housing and supporting the shaft, and the vaned air guide is mounted to the motor housing with fastening means, the center detail on the vaned air guide cooperating with the motor housing so that the fastening means fastens both the bearing assembly and the vaned air guide to the motor housing.

23. The air guide and motor assembly as defined in claim 20 further comprising a fan housing covering the fan, the rim on the vaned air guide cooperating with the motor housing and the fan housing sot hat the vaned air guide is secured fastened therebetween.

24. The air guide and motor assembly as defined in claim 20 wherein the center detail of the vaned air guide assists in locating the vaned air guide in position on the motor housing.

25. The air guide and motor assembly as defined in claim 20 wherein the motor housing has an open-web construction, the vaned air guide cooperating with the open-web construction of the motor housing so that airflow exiting the passages is substantially without constriction.

26. The air guide and motor assembly as defined in claim 25 wherein the plurality of radially outwardly curved vanes form more than nine passages.

27. The air guide and motor assembly as defined in claim 25 wherein each passage has a chamfered edge at the inlet surface.

28. A method of reducing vibration induced noise in an appliance comprising a motor having a motor housing, a fan, and a vaned air guide interposed therebetween, the method comprising the steps of:
providing the vaned air guide with a center detail comprising a plurality of locating tabs integrally formed with the vaned air guide;
providing the vaned air guide with a rim;
providing a recess in the motor housing for accepting the plurality of locating tabs;
engaging the plurality of locating tabs with the recess so that the vaned air guide contacts the motor housing substantially only along the center detail and the rim; and
fastening the vaned air guide to the motor housing to induce clamping forces in the vaned air guide and the motor housing at respective contact locations, the clamping forces reducing creep-induced loosening and vibration of the vaned air guide against the motor housing.

29. The method of fastening an air guide to a motor housing in an appliance comprising a motor having an armature and motor housing, a shaft extending from the armature, a bearing assembly mounted on the motor housing and supporting the shaft, a fan mounted on the shaft, and a vaned air guide mounted with fastening means to the motor housing, the method comprising the steps of:
providing the vaned air guide with a center detail comprising at least one fastener supporting face and a plurality of locating tabs integrally formed with the vaned air guide;
providing the motor housing with a portion that accepts the bearing assembly and a recess for accepting the plurality of locating tabs;
locating the vaned air guide on the motor housing by engaging the plurality of locating tabs in the recess;
engaging the bearing assembly with the portion of the motor housing that accepts the bearing assembly; and
fastening the vaned air guide to the motor housing so that the fastening means extends through the fastener supporting face of the center detail to fasten both the bearing assembly and the vaned air guide to the motor housing.

30. A method of reducing noise in an appliance comprising a motor having a motor housing, a fan, and a vaned air guide interposed therebetween, the method comprising the steps of:
   providing the vaned air guide with a center detail comprising a plurality of arc-shaped tabs integrally formed with the vaned air guide;
   providing the motor housing with a recess that engages the plurality of arc-shaped tabs;
   frictionally engaging the vaned air guide on the motor housing so that the plurality of arc-shaped tabs are securely engaged in the recess of the motor housing.

31. A method of fastening an air guide to a motor housing in an appliance comprising a motor having a motor housing and a shaft, a fan mounted on the shaft, a fan housing covering the fan and an air guide mounted between the fan and the motor housing, the method comprising the steps of:
   providing the air guide with center detail comprising a plurality of locating tabs and a rim having a first step, the plurality of locating tabs and the rim integrally formed with the air guide;
   providing the fan housing with a second step to capture the first step on the rim of the air guide;
   providing the motor housing with a recess that engages the plurality of locating tabs;
   disposing the air guide on the motor housing so that the plurality of locating tabs engages the recess in the motor housing;
   mounting the fan on the shaft;
   locating the fan housing over the fan and the air guide; and
   engaging the fan housing to the motor housing so that the second step in the fan housing captures the first step on the rim of the air guide and fastens the air guide securely to the motor housing.

* * * * *

UNITED STATES PATENT AND TRADEMARK OFFICE
CERTIFICATE OF CORRECTION

PATENT NO. : 5,296,769
DATED : March 22, 1994
INVENTOR(S) : Paul W. Havens, Dennis J. Mancl It is certified that error appears in the above-indentified patent and that said Letters Patent is hereby corrected as shown below:

column 8, line 37, "α" should be deleted and "43" should be replaced by -- 43' --.

claim 11, column 10, line 47, "1" should be replaced by -- 8 --.

claim 23, column 12, line 8, "sot hat" should be replaced by -- so that --.

claim 23, column 12, line 9, "secured" should be replaced by -- securely --.

Signed and Sealed this

Fourth Day of April, 1995

*Attest:*

BRUCE LEHMAN

*Attesting Officer*  Commissioner of Patents and Trademarks